(12) United States Patent
Roussille et al.

(10) Patent No.: US 10,718,235 B2
(45) Date of Patent: Jul. 21, 2020

(54) TURBINE RING ASSEMBLY COMPRISING A PLURALITY OF RING SECTORS MADE OF CERAMIC MATRIX COMPOSITE MATERIAL

(71) Applicant: SAFRAN AIRCRAFT ENGINES, Paris (FR)

(72) Inventors: Clément Roussille, Bordeaux (FR); Thierry Tesson, Bordeaux (FR)

(73) Assignee: SAFRAN AIRCRAFT ENGINES, Paris (FR)

( * ) Notice: Subject to any disclaimer, the term of this patent is extended or adjusted under 35 U.S.C. 154(b) by 285 days.

(21) Appl. No.: 15/560,754

(22) PCT Filed: Mar. 22, 2016

(86) PCT No.: PCT/FR2016/050627
§ 371 (c)(1),
(2) Date: Sep. 22, 2017

(87) PCT Pub. No.: WO2016/151233
PCT Pub. Date: Sep. 29, 2016

(65) Prior Publication Data
US 2018/0080344 A1 Mar. 22, 2018

(30) Foreign Application Priority Data
Mar. 23, 2015 (FR) .................................... 15 52372

(51) Int. Cl.
*F01D 25/24* (2006.01)
*F01D 11/12* (2006.01)
(Continued)

(52) U.S. Cl.
CPC ............. *F01D 25/246* (2013.01); *F01D 9/04* (2013.01); *F01D 11/122* (2013.01);
(Continued)

(58) Field of Classification Search
CPC ... F01D 9/02; F01D 9/04; F01D 11/08; F01D 11/12; F01D 11/122; F01D 25/005;
(Continued)

(56) References Cited

U.S. PATENT DOCUMENTS

| 6,733,233 B2 * | 5/2004 | Jasklowski ........... F01D 11/025 415/135 |
| 6,758,653 B2 * | 7/2004 | Morrison .................. F01D 9/04 415/116 |

(Continued)

FOREIGN PATENT DOCUMENTS

| EP | 2 631 434 A2 | 8/2013 |
| EP | 2 960 440 A1 | 12/2015 |
| WO | WO 2006/136755 A2 | 12/2006 |

OTHER PUBLICATIONS

International Search Report as issued in International Patent Application No. PCT/FR2016/050627, dated Jun. 22, 2016.
(Continued)

*Primary Examiner* — David E Sosnowski
*Assistant Examiner* — Alexander A White
(74) *Attorney, Agent, or Firm* — Pillsbury Winthrop Shaw Pittman LLP

(57) ABSTRACT

A turbine ring assembly includes a ring support structure and a plurality of ring sectors made of ceramic matrix composite material, each ring sector having a portion forming an annular base with an inside face defining the inside face of the turbine ring, and an outside face from which there extends a wall defining an internal housing in which a holder member made of metal material is present, the holder member being connected to the ring support structure and including a body from which elastically deformable holder elements extend inside the internal housing on either side of the body, the holder elements bearing against the wall.

10 Claims, 4 Drawing Sheets

(51) Int. Cl.
*F01D 25/00* (2006.01)
*F01D 9/04* (2006.01)
(52) U.S. Cl.
CPC ........ *F01D 25/005* (2013.01); *F05D 2220/32* (2013.01); *F05D 2240/11* (2013.01); *F05D 2240/14* (2013.01); *F05D 2300/6033* (2013.01); *Y02T 50/672* (2013.01)
(58) Field of Classification Search
CPC ........ F01D 25/24; F01D 25/246; F01D 25/28; F05D 2220/32; F05D 2240/11; F05D 2240/14; F05D 2240/90; F05D 2260/30; F05D 2260/31; F05D 2260/38; F05D 2300/6033
See application file for complete search history.

(56) References Cited

U.S. PATENT DOCUMENTS

| | | |
|---|---|---|
| 2012/0027572 A1 | 2/2012 | Denece et al. |
| 2012/0171027 A1 | 7/2012 | Albers et al. |

OTHER PUBLICATIONS

Notice on the First Office Action as issued in Chinese Patent Application No. 201680019173.5, dated Jan. 11, 2019.

* cited by examiner

TURBINE RING ASSEMBLY COMPRISING A PLURALITY OF RING SECTORS MADE OF CERAMIC MATRIX COMPOSITE MATERIAL

CROSS REFERENCE TO RELATED APPLICATIONS

This application is the U.S. National Stage of PCT/FR2016/050627 filed Mar. 22, 2016, which in turn claims priority to French Application No. 1552372, filed Mar. 23, 2015. The contents of both applications are incorporated herein by reference in their entirety.

BACKGROUND OF THE INVENTION

The invention relates to a turbine ring assembly comprising a plurality of ring sectors made of ceramic matrix composite material, together with a ring support structure.

With turbine ring assemblies made entirely out of metal, it is necessary to cool all of the elements of the assembly and in particular the turbine ring that is subjected to the hottest streams. Such cooling has a significant impact on the performance of the engine since the cooling stream that is used is taken from the main stream of the engine. In addition, the use of metal for the turbine ring limits potential for increasing the temperature in the turbine, even though that would make it possible to improve the performance of aeroengines.

In an attempt to solve those problems, proposals have been made for turbine ring sectors to be made out of ceramic matrix composite (CMC) material in order to avoid using a metal material.

CMC materials present good mechanical properties making them suitable for constituting structural elements, and advantageously they conserve these properties at high temperatures. The use of CMC materials has advantageously made it possible to reduce the cooling stream that needs to be used in operation, and thus to increase the performance of turbine engines. In addition, using CMC materials serves advantageously to reduce the weight of turbine engines and to reduce the effect of expansion while hot that is encountered with metal parts.

Nevertheless, existing solutions that have been proposed can involve assembling a CMC ring sector with metal attachment portions of a ring support structure, which attachment portions are subjected to the hot stream. Consequently, those assembly solutions can still require a cooling stream to be used, at least for cooling said metal attachment portions. In addition, the metal attachment portions expand when hot, which can lead to putting stress on CMC ring sectors and to weakening them.

There therefore exists a need to improve existing turbine ring assemblies that use a CMC material in order to further reduce the quantity of cooling gas that is needed.

There also exists a need to improve existing turbine ring assemblies using CMC material in order to reduce the magnitude of the mechanical stresses to which the CMC ring sectors are subjected in operation.

OBJECT AND SUMMARY OF THE INVENTION

To this end, in a first aspect, the invention provides a turbine ring assembly comprising a ring support structure and a plurality of ring sectors made of ceramic matrix composite material, each ring sector having a portion forming an annular base with an inside face defining the inside face of the turbine ring, and an outside face from which there extends a wall defining an internal housing in which a holder member made of metal material is present, the holder member being connected to the ring support structure and comprising a body from which elastically deformable holder elements extend inside the internal housing on either side of the body, the holder elements bearing against the wall.

In the invention, the holder member serving to hold the ring sector to the ring support structure is present in an internal housing of the ring sector and is consequently protected from the hot stream by the CMC ring sector, which presents low thermal conductivity and thus constitutes a thermal barrier for the holder member. The CMC ring sector thus serves to obtain thermal decoupling between the inside face of the turbine ring and the holder member. The configuration of the invention thus makes it possible to reduce the quantity of gas needed for cooling the portions that hold the ring sector to the ring support structure, and consequently leads to an increase in the performance of the engine. Furthermore, because of the thermal expansion of the metal material of the holder member, it exerts pressure on the ring sector, thus serving to hold it in position while in operation.

In an embodiment, the holder elements may bear against the wall over a portion only of their length.

Unless mentioned to the contrary, the length of a holder element is measured along the longitudinal axis of the internal housing.

Such a characteristic advantageously makes it possible for the holder element to bear locally against the wall and thus hold the ring sector in position, while imparting little stress thereto. Such a configuration allows the holder element to slide over the wall in the event of differential expansion, and consequently to compensate for expansion differences between the holder member and the ring sector.

The holder elements may bear against the wall over a length that is shorter than or equal to three-quarters of their own length, preferably less than or equal to half their own length, more preferably less than or equal to one-fourth of their own length.

In an embodiment, the holder elements may bear against the wall via their distal portions. In particular, the holder elements may bear against the wall solely via their distal portions.

The distal portion of a holder element corresponds to the portion of said holder element lying between its distal end and the zone situated halfway along the holder element, the holder element extending between a proximal end situated beside the body of the holder element and a distal end situated remote from said body.

In particular, the holder elements may bear against the wall at first and second ends of the internal housing.

In an embodiment, the wall may present at least one recess through which there passes at least one fastener element enabling the body of the holder member to be fastened to the ring support structure.

The recess serves to connect the holder member to the ring support structure. The recess may also constitute a ventilation orifice enabling cooling air to be brought to the holder member and to the ring sector.

In an embodiment, the length of the holder element is longer than or equal to half the length of the internal housing, e.g. longer than or equal to three-fourths of the length of the internal housing.

Unless mentioned to the contrary, the length of the holder member is measured along the longitudinal axis of the internal housing.

In an embodiment, the length of some or all of the holder elements is greater than the length of the body of the holder member, e.g. longer than or equal to twice the length of the body of the holder member.

Holder elements of relatively long length advantageously present increased springiness, thus making it possible to obtain particularly flexible bearing of the holder elements against the ring sector and thus compensate better for differential expansion between the holder member and the ring sector, without affecting the holding in position of the ring sector.

Unless mentioned to the contrary, the length of the body of the holder member is measured along the longitudinal axis of the internal housing.

In a variant, the length of some or all of the holder elements is shorter than the length of the body of the holder member.

Some or all of the holder elements may present length that is longer than their width, preferably longer than or equal to three times their width.

The width of a holder element corresponds to its greatest transverse dimension.

In an embodiment, the internal housing may extend along a longitudinal axis, and the holder elements may bear against the wall via holder zones that are symmetrical relative to the longitudinal axis.

In an embodiment, the holder elements may be in the form of tabs. In a variant, the holder elements may be in the form of flared portions. The flared portions extend getting wider over all or part of their length on going away from the body of the holder member towards one of the ends of the internal housing.

The present invention also provides a turbine engine including a turbine ring assembly as defined above.

In an embodiment, the turbine ring assembly may form part of a turbine nozzle in the turbine engine.

The turbine ring assembly may form part of an aeroengine gas turbine, or in a variant it may form part of an industrial turbine.

BRIEF DESCRIPTION OF THE DRAWINGS

Other characteristics and advantages of the invention appear from the following description of particular embodiments of the invention given as non-limiting examples and with reference to the accompanying drawings, in which.

DETAILED DESCRIPTION OF EMBODIMENTS

Figure 1:
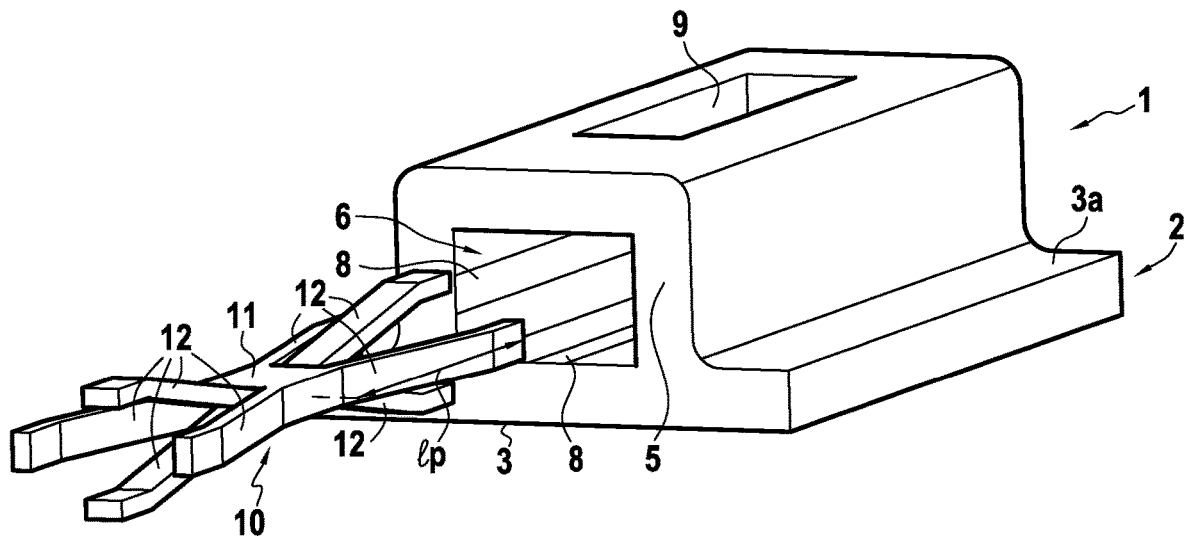
FIGS. 1 and 2 show a holder member and a ring sector relating to a first embodiment of the invention.
Figure 2:
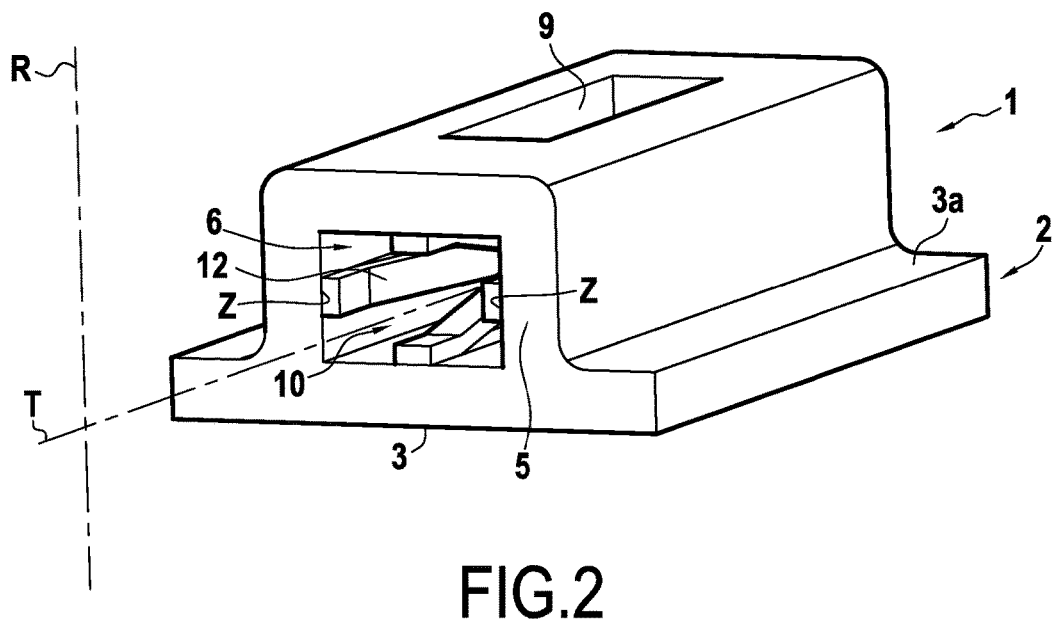

FIG. 1 shows a turbine ring sector 1 together with a holder member 10 in a first embodiment of the invention. In FIG. 1, the holder member 10 is shown separately from the turbine ring sector 1. FIG. 2 shows the operating configuration of the FIG. 1 assembly in which the holder member 10 serves to hold the ring sector 1 to the ring support structure, the holder member 10 being housed in the ring sector 1. In order to form a turbine ring surrounding a set of rotary blades, a plurality of ring sectors 1, each having a holder member 10, are mounted on a casing 14 (see FIG. 3) that is made of metal material and that constitutes a ring support structure. In conventional manner, the ring sectors 1 may each be provided with one or more sealing strips (not shown). Once the set of ring sectors 1 has been mounted on the ring support structure, these sealing strips serve to reduce or even eliminate leaks of air between the ring sectors 1.

The ring sectors 1 are single pieces made of CMC. Using a CMC material for making ring sectors 1 is advantageous in order to reduce requirements for ring ventilation. The ring sectors 1 have an annular base 2. The inside face 3 relative to the radial direction R of the annular base 2 is coated in a layer of abradable material (not shown in FIGS. 1 to 3) and it defines the passage in which the gas stream flows through the turbine. The radial direction R corresponds to the direction along a radius of the turbine ring (a straight line connecting the center of the turbine ring to its periphery). The annular base 2 also presents a face 3a that is outside relative to the radial direction R. Each ring sector 1 presents a wall 5 extending from the outside face 3a of the annular base 2. The wall 5 defines an internal housing 6 extending along a longitudinal axis. The internal housing 6 extends in the tangential direction T. The tangential direction T corresponds to the circumferential direction of the turbine ring.

A holder member 10 made of metal material is present in the internal housing 6. The holder member 10 may be made from a superalloy, e.g. the "AM1" superalloy. The holder member 10 comprises a body 11 from which holder elements 12 extend in the tangential direction on both sides of the body 11, which holder elements 12 are made of metal material and come to bear against the wall 5. In the example shown, the body 11 does not bear against the wall 5 defining the internal housing 6. The holder member 10 bears against the wall 5 solely via the holder elements 12. Thus, the holder elements 12 alone exert sufficient pressure against the wall 5 to hold the ring sector 1.

Figure 3:
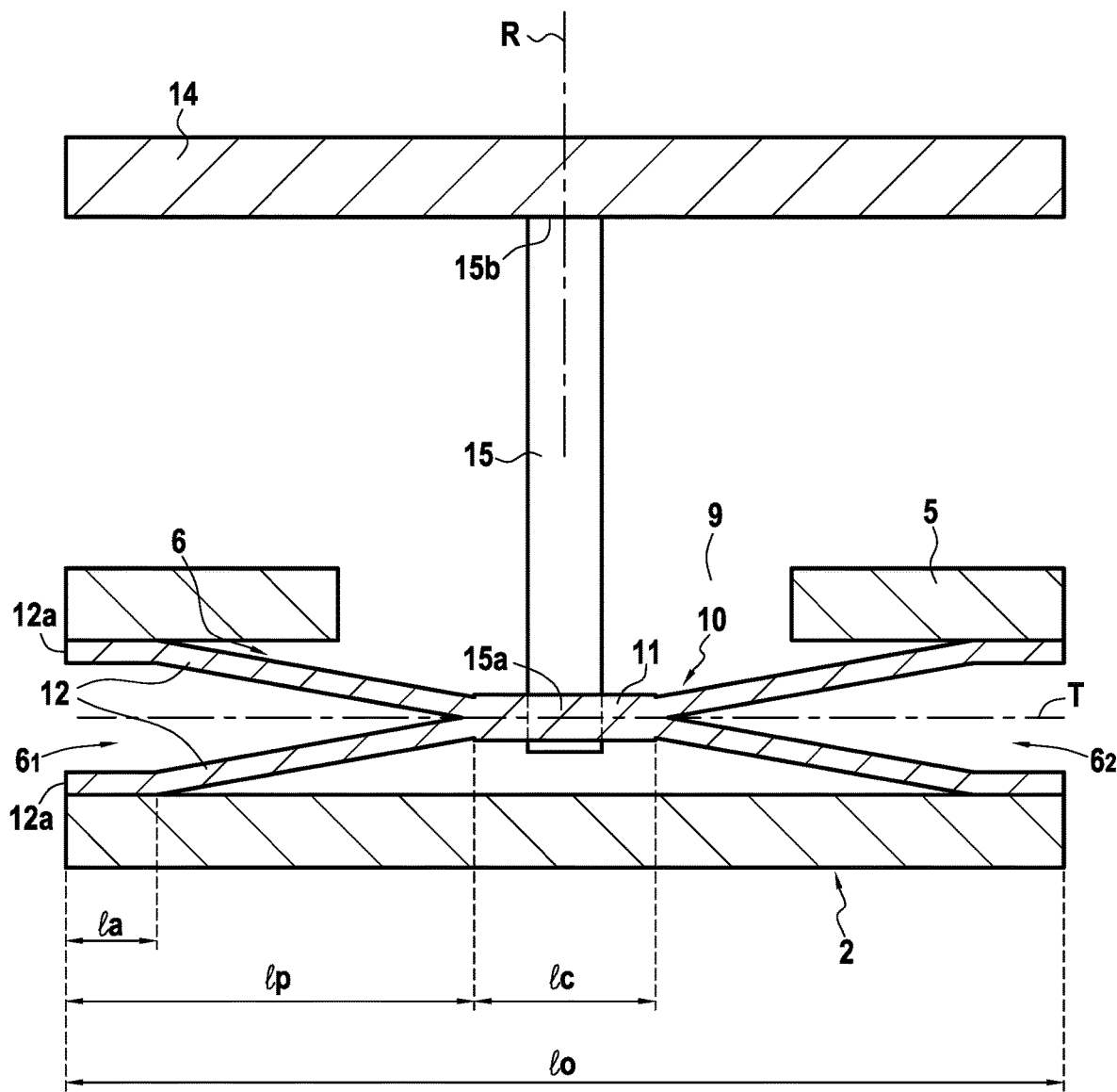
FIG. 3 is a fragmentary diagrammatic view in section on the tangential direction of the assembly shown diagrammatically in FIG. 2.

In the example shown, the holder elements 12 are in the form of tabs. In the example shown, the wall 5 is provided with grooves 8 for co-operating with the holder tabs 12. In a variant that is not shown, the wall is not provided with such grooves. As shown in FIG. 3, a first set of tabs 12 bears against the wall 5 beside the first end $6_1$ of the internal housing 6, and a second set of tabs 12 bears against the wall 5 beside the second end $6_2$ of the internal housing 6. The holder member 10 is connected firstly to the casing 14 and secondly to the ring sector 1 by the holder elements 12 bearing against the wall 5 defining the internal housing 6. The holder elements 12 exert pressure on the ring sector 1 both along the radial direction R and along the axial direction A. The axial direction A corresponds to the direction along the axis of revolution of the turbine ring and to the flow direction of the gas stream in the passage. More precisely, in the example shown, a first subset of the holder elements 12 apply outward radial pressure (away from the passage), and a second subset of the holder elements 12 apply inward radial pressure (towards the passage). In the example shown, there are as many holder elements 12 applying outward radial pressure as there are holder elements 12 applying inward radial pressure. In analogous manner, a third subset of the holder elements 12 apply axial pressure in the upstream direction and a fourth subset of the holder elements 12 apply axial pressure in the downstream direction. The terms "upstream" and "downstream" are used herein with reference to the flow direction of the gas stream through the turbine (see arrow F in FIG. 4). In the example shown, there are as many holder elements 12 applying upstream axial pressure as there are holder elements 12 applying downstream axial pressure. In the example shown, the holder member 10 provides eight bearing points against the wall 5 of the ring sector 1: two bearing points where outward radial pressure is applied; two bearing points where inward radial pressure is applied; two bearing points where upstream axial pressure is applied; and two bearing points where downstream axial pressure is applied. In the example shown, the holder elements 12 bear against a plurality of distinct faces of the wall 5 defining the internal housing 6. FIGS. 1 to 3 show the situation in which the internal housing 6 is a through housing, but the invention is not limited to this situation, it being possible in variants that are not shown for the internal housing to be in the form of a blind hole, for example.

The internal housing 6 is accessible from the outside of the ring sector 1 at least via a through recess 9 situated in the wall 5 so as to connect the holder member 10 to the casing 14, as shown diagrammatically in FIG. 3.

The casing 14 has a plurality of fastener elements 15 in the form of attachment tabs extending radially through the recesses 9 towards a flow passage for the gas stream. The attachment tabs 15 of the casing 14 grip the body 11 of the holder member 10 in order to fasten it to the casing 14. Each attachment tab 15 presents a zone 15a situated facing the body 11 of the holder member and an outer radial end 15b situated beside the casing 14. In order to assemble the ring sectors 1 to the casing 14, the holder member 10 is initially inserted in the internal housing 6. The holder member 10 inserted in the internal housing 6 is lightly prestressed at ambient temperature (i.e. a temperature of 20° C.). The assembly constituted by the ring sector 1 and the holder member 10 received in the ring sector 1 is assembled with the casing 14 by causing the body 11 of the holder member 10 to be gripped by the attachment tabs 15 of the casing 14. It would not go beyond the ambit of the invention for the body to be fastened to the casing in a manner other than by gripping, e.g. by screw fastening.

As shown in FIG. 3, the attachment tabs 15 of the casing 14 are housed in part in the housing 6 (i.e. only a portion of the length of the attachment tabs 15 is housed in the housing 6). The recess 9 also constitutes a ventilation orifice enabling cooling air to be brought to the holder member 10 and to the ring sector 1.

The fact that the holder member 10 and portions of the attachment tabs 15 are housed in the housing 6 of the CMC ring sector 1 advantageously makes it possible to protect these elements from the heat of the gas stream flowing in the passage since the ring sector 1 withstands heat and forms a thermal barrier. Furthermore, the presence of the differential expansion phenomenon serves advantageously to hold the ring sector axially and radially in position as a result of the pressure exerted by the holder member 10 thereagainst while in operation.

As shown in FIG. 3, the tabs 12 bear against the wall 5 over a length $l_a$ that is less than or equal to one-fourth of the length $l_p$ of the tabs 12. The length of the tabs $l_p$ is also greater than the length $l_p$ of the body 11 of the holder member 10. In the example shown, the tabs 12 bear against the wall 5 via their distal ends 12a situated remote from the body 11. The holder member 10 extends over a length $l_o$ that is substantially equal to the length of the internal housing 6. Thus, the holder member 10 extends from the first end $6_1$ to the second end $6_2$ of the internal housing 6. As shown in FIG. 1, the tabs 12 bear against the wall 5 via holder zones Z that are symmetrical relative to the tangential direction T. The holder member 10 thus has at least one first holder element 12 bearing against the wall 5 via a first holder zone Z and at least one second holder element 12 bearing against the wall 5 via a second holder zone Z that is symmetrical to the first holder zone relative to the tangential direction T (or relative to the longitudinal axis of the housing 6). The first and second holder zones are offset radially or axially. The first and second holder zones may each form part of a distinct base of the wall 5. The holder zones Z extend over a portion only of the inside circumference of the wall 5. In the example shown, the tabs 12 bear flat against the wall 5.

Each above-described ring sector 1 is made of CMC by forming a fiber preform of shape similar to that of the ring sector and by densifying the ring sector with a ceramic matrix.

In order to make the fiber preform, it is possible to use yarns made of ceramic material, e.g. silicon carbide (SiC) yarns such as those sold by the Japanese supplier Nippon Carbon under the name "Nicalon", or else carbon yarns.

The fiber preform is advantageously made by three-dimensional weaving or by multilayer weaving. The weaving may be of the interlock type. Other three-dimensional or multilayer weaves may be used, e.g. such as multi-plain or multi-satin weaves. Reference may be made to Document WO 2006/136755.

After weaving, the resulting fiber blank is shaped in order to obtain a ring sector preform, which is subsequently consolidated and densified with a ceramic matrix, it being possible for densification to be performed in particular by means of a chemical vapor infiltration (CVI) method, as is well known. A detailed example of fabricating CMC ring sectors is described in particular in Document US 2012/0027572.

Figure 4:
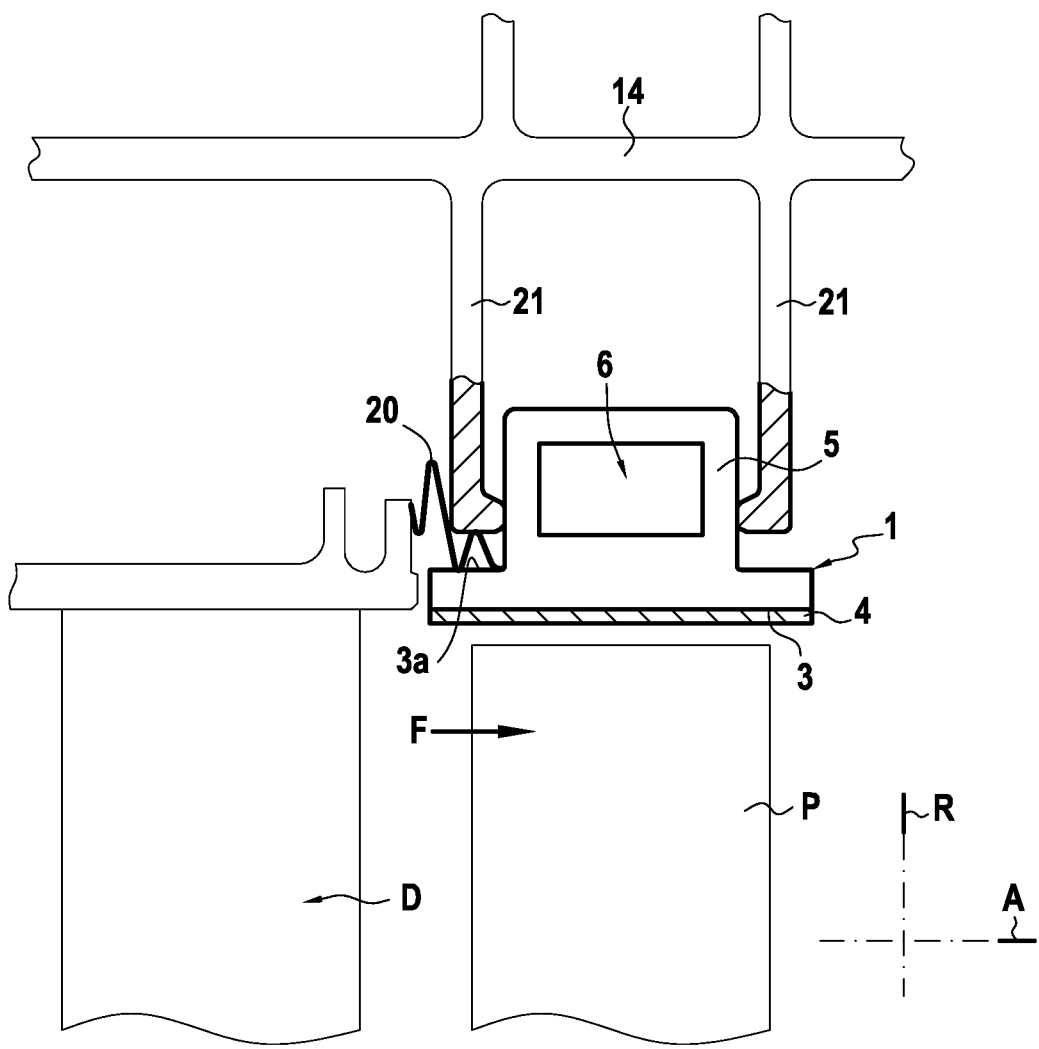
FIG. 4 is a fragmentary diagrammatic view in section perpendicularly to the tangential direction showing the FIG. 2 ring sector once mounted on the ring support structure.

FIG. 4 is a fragmentary diagrammatic view in section perpendicular to the tangential direction showing the ring sector 1 of FIG. 2 once assembled with the ring support structure 14. FIG. 4 shows the means used for providing axial sealing, and for reasons of simplicity, the holder member 10 and the attachment tabs 15 are not shown. The layer of abradable material 4 covering the inside face 3 of the annular base 2 is shown in FIG. 4. The layer of abradable material 4 is situated facing a set of rotary blades P. The arrow F shows the flow direction of the gas stream through the turbine. The gas stream flows along the axial direction A of the high pressure nozzle D towards the low pressure nozzle (not shown). In order to provide axial sealing, an annular sealing gasket 20 is present on the outside face 3a of the annular base 2 of the turbine ring sector 1 beside the high pressure nozzle D. The ring sector 1 is also gripped via the wall 5 by sealing tabs 21 of the casing 14. The gasket 20 and the tabs 21 prevent an axially-directed gas stream from flowing between the ring sector 1 and the casing 14.

Figure 5:
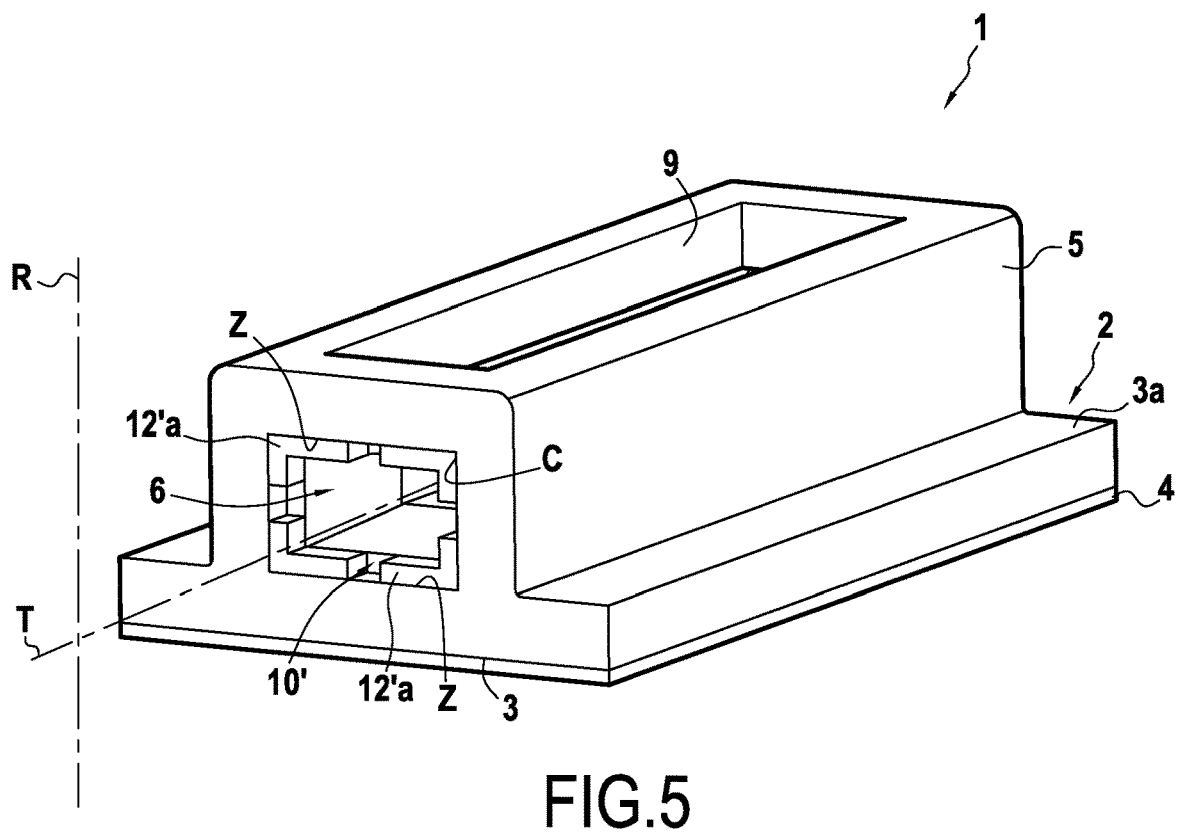
FIG. 5 shows a holder member together with a ring sector relating to a second embodiment of the invention.
Figure 6:
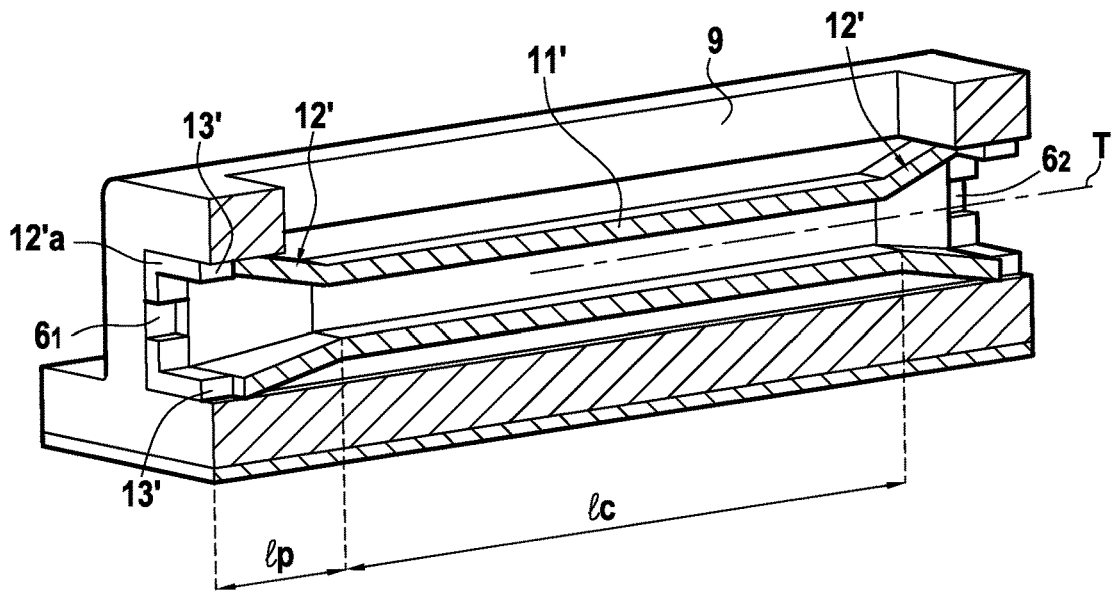
FIG. 6 is a section view in the tangential direction of the assembly shown diagrammatically in FIG. 5.

FIGS. 5 and 6 show a variant embodiment in which a holder member 10' made of metal material is present in the internal housing 6. The layer of abradable material 4 covering the inside face 3 of the annular base 2 is shown in FIGS. 5 and 6. The holder member 10' is connected to the ring support structure in the same manner as that described with reference to FIG. 3. The holder member 10' comprises a body 11' from which elastically deformable holder elements 12' extend in the tangential direction T on either side of the body 11', which holder elements 12' come to bear against the wall 5 defining the internal housing 6. In the example shown in FIGS. 5 and 6, the holder elements 12' are in the form of flared portions extending from the body 11 towards the ends of the internal housing 6. In the example shown, the flared portions 12' become wider over a portion of their length on going from the body 11' towards one of the ends 6₂ or 6₂ of the internal housing 6. The flared portions 12' present bearing portions 13' that are situated in the example shown at their distal ends 12'a. The bearing portions 13' bear against the wall 5 in order to hold the ring sector 1 to the ring support structure. In the same manner as that described for the embodiment shown in FIGS. 1 to 3, the flared portions 12' bear against the wall 5 defining the internal housing 6 at their distal ends 12'a. The flared portions 12' in this embodiment extend over a length $l_p$ that is less than the length $l_p$ of the body 11' of the holder member 10'. In the embodiment shown in FIGS. 5 and 6, the bearing portions 13' of the flared portions 12' are present at the ends 6₂ and 6₂ of the internal housing 6. In section perpendicular to its longitudinal axis, the internal housing 6 presents corners C with the bearing portions 13' coming to bear against the corners C of the internal housing 6. In the example shown, the bearing portions 13' of the flared portions 12' are not in contact with one another, but it would not go beyond the ambit of the invention if they were. As in the example of FIGS. 1 to 3, the flared portions 12' bear against the wall 5 via holder zones Z that are symmetrical relative to the longitudinal axis of the internal housing 6. In a variant that is not shown, each flared portion presents a single bearing portion coming to bear over some or all of the inside circumference of the wall.

In order to perform assembly with this embodiment, the holder member 10 is inserted into the internal housing 6 in such a manner as to position its bearing portions 13' at the first and second ends 6₁ and 6₂ of the internal housing 6. The holder member 10' inserted in the internal housing 6 is lightly prestressed at ambient temperature. The assembly constituted by the holder member 10' and the ring sector 1 is then fastened to the attachment tabs of the casing in the same manner as in FIG. 3.

In the embodiment shown, there can be seen an internal housing of shape that is rectangular when observed in section perpendicularly to its longitudinal axis. It would not go beyond the ambit of the invention for the internal housing to present some other shape, such as a shape that is square or circular when observed in section perpendicularly to its longitudinal axis.

The term "lying in the range . . . to . . . " should be understood as including the limits.

The invention claimed is:

1. A turbine ring assembly comprising a ring support structure and a plurality of ring sectors made of ceramic matrix composite material, each of the plurality of ring sectors having a portion forming an annular base with an inside face relative to a radial direction defining an inside face of the turbine ring, and an outside face relative to the radial direction from which there extends a wall defining an internal housing in which a holder member made of metal material is present, the holder member being connected to the ring support structure and comprising a body from which elastically deformable holder elements extend inside the internal housing on either side of the body, the holder elements bearing against the wall, the holder elements exerting pressure against a respective one of the plurality of ring sectors along radial and axial directions to hold the respective one of the plurality of ring sectors axially and radially in position.

2. The turbine ring assembly according to claim 1, wherein the holder elements bear against the wall over a portion only of their length.

3. The turbine ring assembly according to claim 1, wherein the holder elements bear against the wall via their distal portions.

4. The turbine ring assembly according to claim 3, wherein the holder elements bear against the wall at first and second circumferential ends of the internal housing.

5. The turbine ring assembly according to claim 1, wherein the holder elements are in the form of tabs.

6. The turbine ring assembly according to claim 1, wherein the holder elements are in the form of flared portions.

7. The turbine ring assembly according to claim 1, wherein the length of some or all of the holder elements is greater than the length of the body of the holder member.

8. The turbine ring assembly according to claim 1, wherein the internal housing extends along a longitudinal axis, and the holder elements bear against the wall via holder zones that are symmetrical relative to the longitudinal axis.

9. The turbine ring assembly according to claim 1, wherein the wall presents at least one recess through which there passes at least one fastener element enabling the body of the holder member to be fastened to the ring support structure.

10. A turbine engine including the turbine ring assembly according to claim 1.

* * * * *